(12) United States Patent
Wang et al.

(10) Patent No.: US 10,626,906 B2
(45) Date of Patent: Apr. 21, 2020

(54) FASTENER STRUCTURE

(71) Applicant: FIVETECH TECHNOLOGY INC., New Taipei (TW)

(72) Inventors: Ting-Jui Wang, New Taipei (TW); Yi-Shien Chou, New Taipei (TW)

(73) Assignee: FIVETECH TECHNOLOGY INC. (TW)

( * ) Notice: Subject to any disclaimer, the term of this patent is extended or adjusted under 35 U.S.C. 154(b) by 0 days.

(21) Appl. No.: 15/978,270

(22) Filed: May 14, 2018

(65) Prior Publication Data

US 2018/0335065 A1 Nov. 22, 2018

(30) Foreign Application Priority Data

May 16, 2017 (TW) .............................. 106206957 U

(51) Int. Cl.
*F16M 11/00* (2006.01)
*F16B 21/02* (2006.01)
*F16B 5/02* (2006.01)
*F16B 35/00* (2006.01)
*F16B 37/12* (2006.01)
*F16B 5/06* (2006.01)
*F16B 21/06* (2006.01)

(52) U.S. Cl.
CPC ............ *F16B 21/02* (2013.01); *F16B 5/0208* (2013.01); *F16B 5/0635* (2013.01); *F16B 35/005* (2013.01); *F16B 37/122* (2013.01); *F16B 21/06* (2013.01)

(58) Field of Classification Search
CPC ........... F16M 11/00; H05K 7/142; H05K 7/12
See application file for complete search history.

(56) References Cited

U.S. PATENT DOCUMENTS

| | | | | |
|---|---|---|---|---|
| 6,771,512 | B2 * | 8/2004 | Paquin | H05K 7/142 174/138 F |
| 8,313,070 | B2 * | 11/2012 | Kronner | A61B 90/50 248/214 |
| 2002/0181219 | A1 * | 12/2002 | Paquin | H05K 7/142 361/809 |
| 2007/0152697 | A1 * | 7/2007 | Hsu | H05K 1/0215 324/763.01 |
| 2019/0154067 | A1 * | 5/2019 | Wang | F16B 5/065 |

* cited by examiner

*Primary Examiner* — Amy J. Sterling
(74) *Attorney, Agent, or Firm* — Schmeiser, Olsen & Watts, LLP

(57) ABSTRACT

A fastener structure includes a fixing member and an operating member. The fixing member includes a limiting section and a body portion; and the operating member includes an operating section, a retaining section and an engaging section connected to the body portion. The body portion can be mounted to an object, and the operating section can be manipulated to move the engaging section on the body portion and to fasten the retaining section to another object. When the operating section is manipulated reversely, the retaining section can be released from the other object to thereby separate the two objects from each other. Therefore, with the fastener structure, two objects can be quickly fastened together and easily released from each other.

17 Claims, 15 Drawing Sheets

FASTENER STRUCTURE

CROSS-REFERENCE TO RELATED APPLICATION

This non-provisional application claims priority under 35 U.S.C. § 119(a) on Patent Application No(s). 106206957 filed in Taiwan, R.O.C. on May 16, 2017, the entire contents of which are hereby incorporated by reference.

FIELD OF THE INVENTION

The present invention relates to a fastener structure, and more particularly, to a fastener structure for holding two objects together, which can quickly fasten two objects together and allows easy release of the two objects from each other.

BACKGROUND OF THE INVENTION

According to the currently available techniques, two objects, such as circuit boards or general panels, are directly fastened together using screws or locking elements. The screws or locking elements can indeed firmly connect two objects together and prevent the connected objects from being easily separated or released from each other.

However, while two objects, such as two panels, can be fastened or locked together using the above conventional fixing manners without the risk of being easily separated or released from each other, it is possible the two connected objects could not be easily assembled to another object. Also, the two objects connected together using screws could not be conveniently detached from each other when necessary.

It is therefore tried by the inventor to develop a fastener structure that not only enables quick connection of two objects together, but also allows easy release of the two objects from each other.

SUMMARY OF THE INVENTION

A primary object of the present invention is to provide a fastener structure that enables quick and easy fastening and releasing of two objects to and from each other, so as to overcome the shortcomings of the conventional ways of fastening two objects to each other.

To achieve the above and other objects, the fastener structure provided according to the present invention includes a fixing member and an operating member. The fixing member includes a limiting section and a body portion; and the operating member includes an operating section, a retaining section and an engaging section connected to the body portion.

In the fastener structure according to an embodiment of the present invention, the body portion is extended through the engaging section with the limiting section abutted against the operating member, such that the limiting section is connected to the operating member.

In the fastener structure according to an embodiment of the present invention, the body portion includes an abutting section, and the operating member is connected to the fixing member to locate between the limiting section and the abutting section or to locate onto the limiting section and the abutting section.

In the fastener structure according to an embodiment of the present invention, the fixing member includes a coupling section for connecting to an object.

In the fastener structure according to an embodiment of the present invention, the operating section is provided with an anti-slip section to ensure a firm grip at the operating section.

In the fastener structure according to the present invention, the anti-slip section can be a recessed section, a protruded section, a fluted section, a knurled section, a toothed section, a post-like section, a beveled section or a cambered section.

In the fastener structure according to an embodiment of the present invention, the coupling section can be connected to the object by riveting, snap-on fastening, expansion connection, welding, screw-fastening or glue bonding.

In the fastener structure according to an embodiment of the present invention, the engaging section is provided with an elastic element, which has two ends separately pressed against the fixing member and the operating member.

In the fastener structure according to the present invention, the elastic element can be a coil spring, a torsion spring, a spring plate or an elastic pillar, or can be an elastic structure integrally formed with the operating member.

In the fastener structure according to the present invention, the retaining section can be a pillar, a plate member, a hooked section, a stepped section, a fastening element, a cambered section, a rectangular section, a curved section, a block, a protruded section or a recessed section.

In the fastener structure according to an embodiment of the present invention, the retaining section is used to fasten to or interfere with another object.

In the fastener structure according to the present invention, the elastic element can apply an elastic force against the operating member to enable reciprocatingly and elastically axial, lateral, linear or rotational operation of the operating member or to limit the operating member from moving, staying or temporarily staying.

In the fastener structure according to an embodiment of the present invention, the engaging section of the operating member includes an elastic retaining section for elastically snap-fitting onto the body portion to move the fixing member or limit the fixing member from moving.

In the fastener structure according to an embodiment of the present invention, the elastic retaining section can be integrally formed with the operating member or additionally assembled to the operating member.

In the fastener structure according to an embodiment of the present invention, the engaging section internally defines a movement space, within which the fixing member is allowed to move or limited from moving.

In the fastener structure according to an embodiment of the present invention, the fastener structure can be individually received in a carrier.

In the fastener structure according to the present invention, the carrier includes a cover to close the carrier and thereby encloses the fastener structure in the carrier.

In the fastener structure according to an embodiment of the present invention, the body portion or the limiting section is provided with an anti-rotation section and the operating member or the engaging section of the operating member is provided with a mating anti-rotation section to prevent the operating member and the fixing member from rotating relative to each other.

In the fastener structure according to the present invention, the operating section can be a protruded section, a recessed section, a stepped section, a grip section, a plate member, a cambered section, a flat section, a curved section, a pillar or a block.

In the fastener structure according to an embodiment of the present invention, the fixing member includes a restricting section for restricting another object to between the retaining section and the restricting section.

In the fastener structure according to the present invention, the restricting section is a stepped section.

In the fastener structure according to an embodiment of the present invention, the coupling section can be a fastening element, a fastening element having at least one fastening plate, or a fastening element having a threaded section.

In the fastener structure according to an embodiment of the present invention, the coupling section includes a weldable layer for welding and accordingly connecting to an object and the fastener structure is received in a carrier, such that the fastener structure can be removed from the carrier with a tool and disposed on a surface or in a through hole of the object for welding to the object.

In the fastener structure according to an embodiment of the present invention, the coupling section is provided with a material retaining space for retaining some material of an object thereto, such that the coupling section interferes with the object to thereby connect the fixing member to the object.

In the fastener structure according to the present invention, the object connected to the coupling section can be an iron member, a plastic member or a printed circuit board (PCB).

In the fastener structure according to an embodiment of the present invention, the coupling section is press-fitted onto the object and some material of the object enters or flows into the material retaining space to thereby connect the coupling section to the object.

In the fastener structure according to an embodiment of the present invention, the coupling section is driven by a pressing member to press against the object and retain some material of the object thereto, so as to connect to the object.

In the fastener structure according to an embodiment of the present invention, the limiting section and the body portion can be integrally formed with each other or be assembled to each other.

In the fastener structure according to an embodiment of the present invention, the abutting section can be integrally formed with the body portion or be assembled to the body portion.

In the fastener structure according to the present invention, the fixing member can be a post-like member, an L-shaped plate member, a block member, a hollow cylindrical member, a solid cylindrical member, a flat plate member, a rectangular member or a stepped member.

In the fastener structure according to the present invention, the engaging section can be integrally formed with or engaged with the limiting section, and the limiting section is movably connected to the body portion.

In the fastener structure according to the present invention, the limiting section can include a mating abutting section and the body portion can include an abutting section; and the abutting section is abutted on the mating abutting section of the limiting section.

With the above arrangements of the fastener structure of the present invention, the body portion can be mounted to an object and the operating section can be manipulated to move the operating member, so that the operating member is movable on the body portion to fasten the retaining section to another object and accordingly connect the two objects together. And, the operating member can be manipulated reversely to release the retaining section from the other object, so that the two objects are separated from each other.

Therefore, with the fastener structure of the present invention, two objects can be quickly connected together and easily released from each other.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
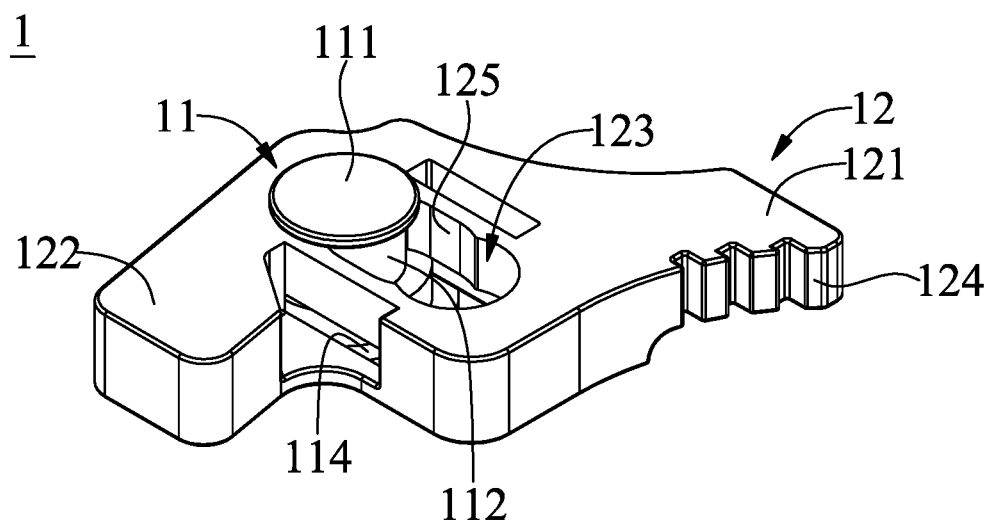
FIG. 1 is a schematic view of a fastener structure according to a first embodiment of the present invention.

The present invention will now be described with some preferred embodiments thereof and by referring to the accompanying drawings. For the purpose of easy to understand, elements that are the same in the preferred embodiments are denoted by the same reference numerals.

Figure 2:
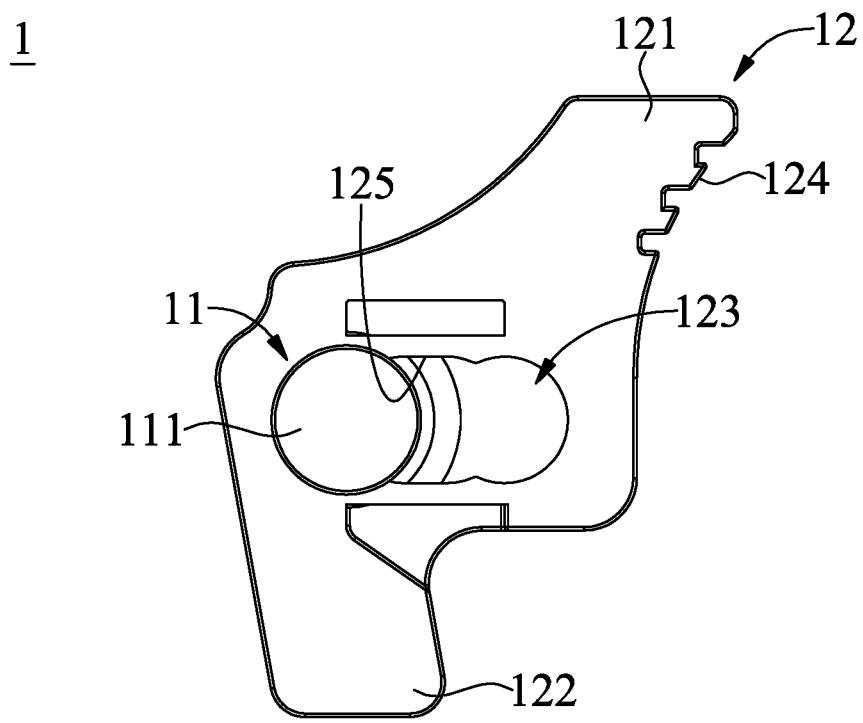
FIG. 2 is a schematic view of a fastener structure according to a first embodiment of the present invention.
Figure 3:
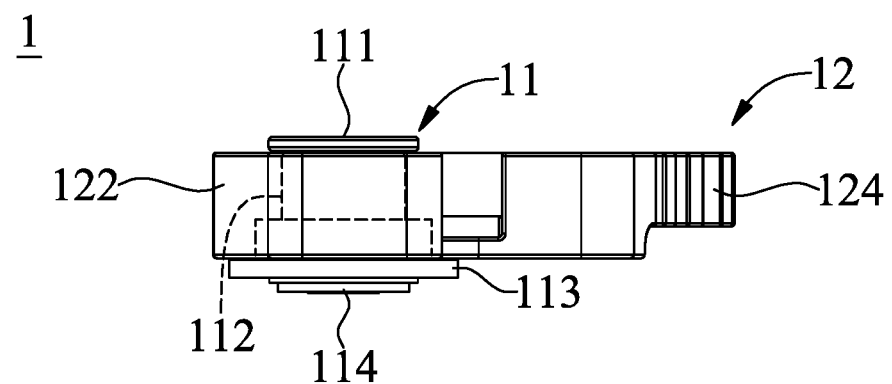
FIG. 3 is a schematic view of a fastener structure according to a first embodiment of the present invention.

Please refer to FIGS. 1 to 3, in which a fastener structure 1 according to a first embodiment of the present invention is shown. As shown, the fastener structure 1 in the first embodiment includes a fixing member 11 and an operating member 12.

The fixing member 11 includes a limiting section 111 and a body portion 112, which can be integrally formed with each other or be assembled to each other. The body portion 112 is provided with an abutting section 113, which can be integrally formed with the body portion 112 or be assembled to the body portion 112. The fixing member 11 further includes a coupling section 114. The fixing member 11 can be a post-like member, an L-shaped plate member, a block member, a hollow cylindrical member, a solid cylindrical member, a flat plate member, a rectangular member or a stepped member.

The operating member 12 includes an operating section 121, a retaining section 122 and an engaging section 123. The body portion 112 of the fixing member 11 is extended through the engaging section 123 to connect the fixing member 11 to the operating member 12 while the limiting section 111 is abutted against an outer surface of the operating member 12 to limit the fixing member 11 from moving further into the operating member 12. Therefore, the operating member 12 is connected to the fixing member 11 to locate between the limiting section 111 and the abutting section 113 or to locate onto the limiting section 111 and the abutting section 113. The operating section 121 is provided with an anti-slip section 124 to ensure a firm grip at the operating section 121. The operating section 121 can be a protruded section, a recessed section, a stepped section, a grip section, a plate-like section, a cambered section, a flat section, a curved section, a pillar or a block; the anti-slip section 124 can be a recessed section, a protruded section, a fluted section, a knurled section, a toothed section, a post-like section, a beveled section or a cambered section; and the retaining section 122 can be a post-like section, a plate-like section, a hooked section, a stepped section, a fastening element, a cambered section, a rectangular section, a curved section, a block, a protruded section or a recessed section. The engaging section 123 of the operating member 12 includes an elastic retaining section 125, which can be integrally formed with the operating member 12 or additionally assembled to the operating member 12 (not shown). The engaging section 123 of the operating member 12 internally defines a movement space, within which the fixing member 11 is allowed to move or limited from moving.

To use the fastener structure 1, first connect the coupling section 114 of the fixing member 11 to an object (not shown), which can be an iron member, a plastic member or a printed circuit board (PCB). The coupling section 114 can be connected to the object by riveting, snap-on fastening, expansion connection, welding, screw-fastening or glue bonding. Then, apply a force at the operating section 121. At this point, the anti-slip section 124 advantageously provides an anti-slip effect, enabling the operating member 12 to move relative to the fixing member 11 within the movement space defined by the engaging section 123. Meanwhile, the elastic retaining section 125 is elastically snap-fitted onto the body portion 112 of the fixing member 11 to limit the fixing member 11 from moving or to move the fixing member 11. By moving the operating member 12, the retaining section 122 is fastened to or caused to interfere with another object (not shown) to complete the fastening of two objects together via the fastener structure 1.

To release the two objects from each other, simply apply a force at the operating section 121 in a reverse direction to release the retaining section 122 from the other object.

Figure 4:
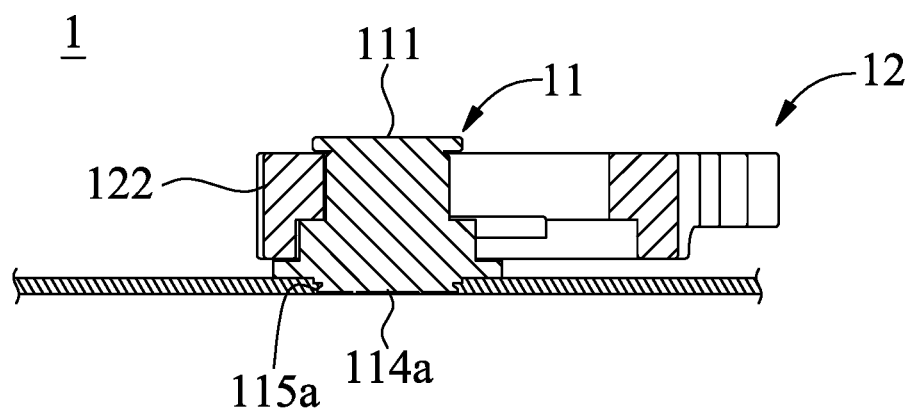
FIG. 4 is a schematic view of a fastener structure according to a second embodiment of the present invention.

Please refer to FIG. 4 that is a schematic view of a fastener structure 1 according to a second embodiment of the present invention. The fastener structure 1 in the second embodiment includes a coupling section 114a, which is provided with a material retaining space 115a. When the fixing member 11 is press-fitted onto an object 2, some material of the object 2 is forced into the material retaining space 115a to interfere with the fixing member 11, so that the fixing member 1 is assembled to the object 2.

Figure 5:
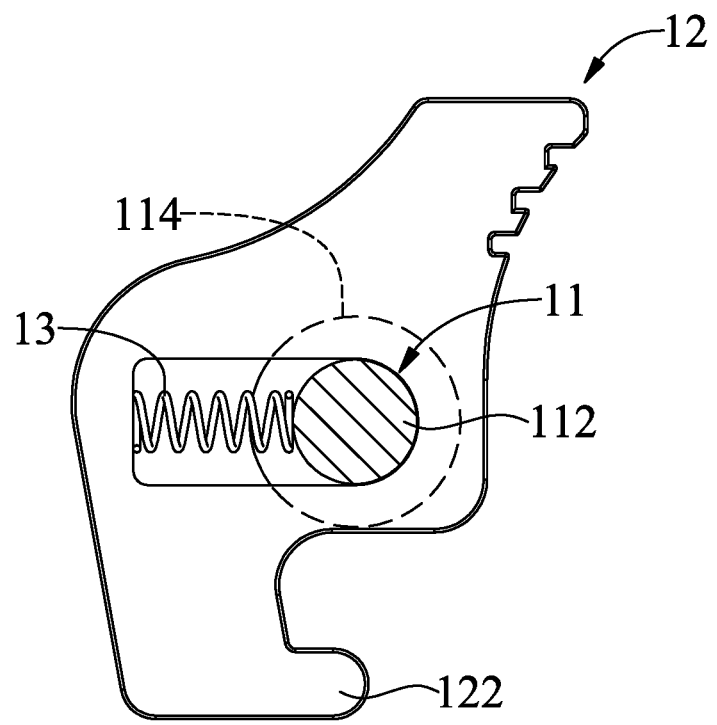
FIG. 5 is a schematic view of a fastener structure according to a third embodiment of the present invention.
Figure 5:
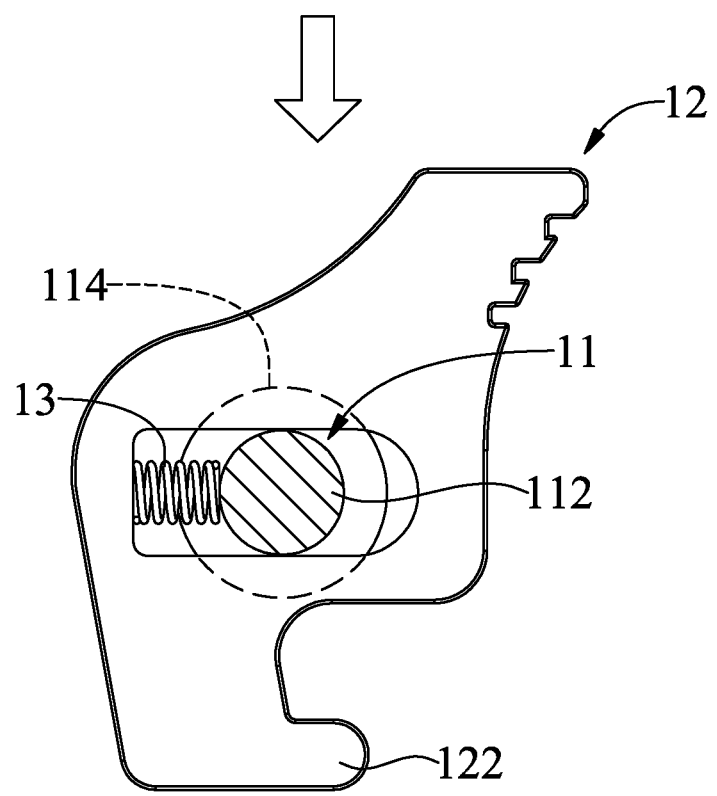
Figure 6:
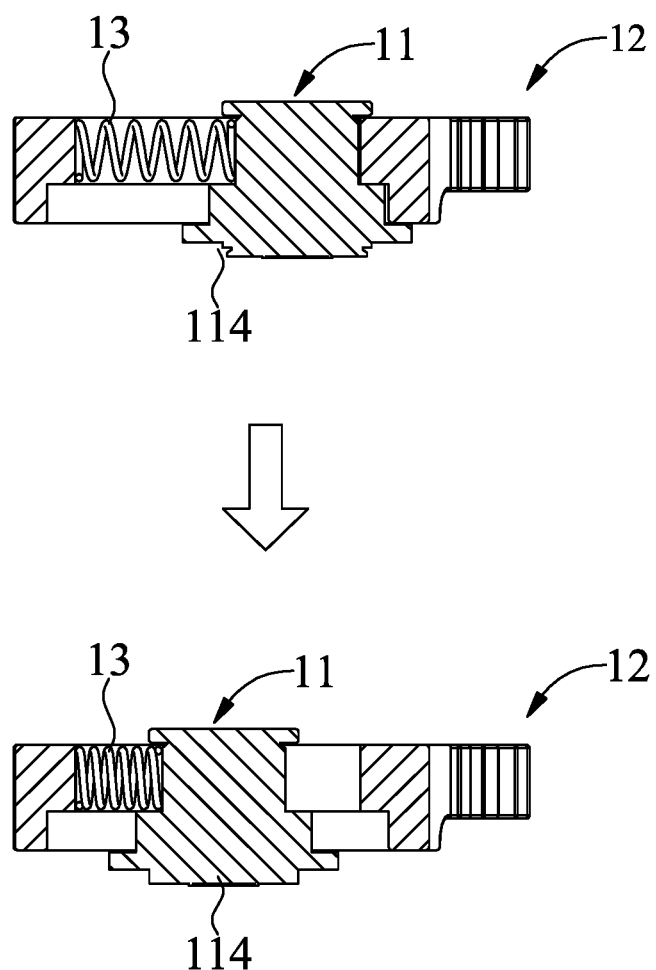
FIG. 6 is a schematic view of a fastener structure according to a third embodiment of the present invention.

Please refer to FIGS. 5 and 6 that are schematic views of a fastener structure according to a third embodiment of the present invention. As shown, in the third embodiment, the fastener structure includes an elastic element 13 provided at the coupling section 114. The elastic element 13 has two ends separately pressed against the fixing member 11 and the operating member 12, so as to apply an elastic force against the operating member 12 to enable reciprocatingly and elastically axial, lateral, linear or rotational operation of the operating member 12, or to limit the operating member 12 from moving, staying or temporarily staying. In the illustrated third embodiment, the elastic element 13 is a coil spring. However, in other operable embodiments, the elastic element 13 can be an elastic structure integrally formed with the operating member 12 (not shown).

Figure 7:
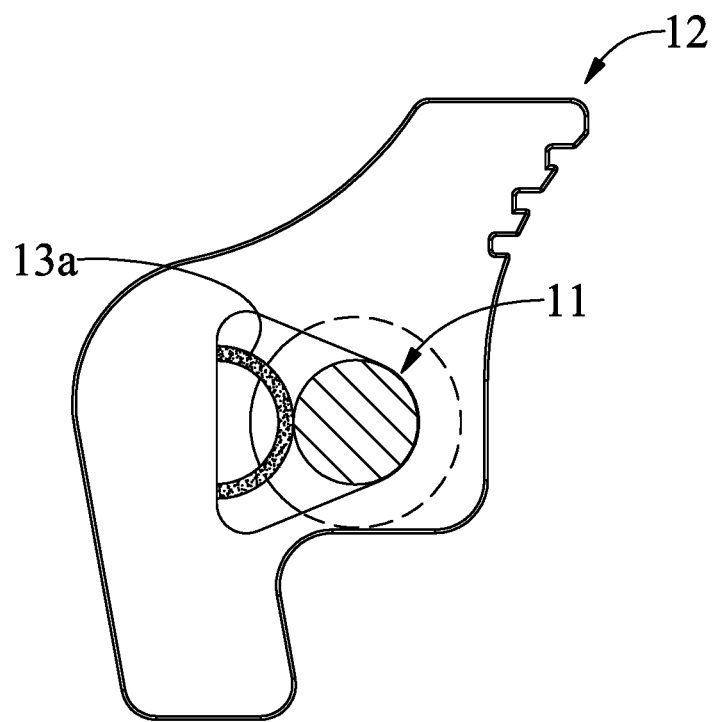
FIG. 7 is a schematic view of a fastener structure according to a fourth embodiment of the present invention.
Figure 8:
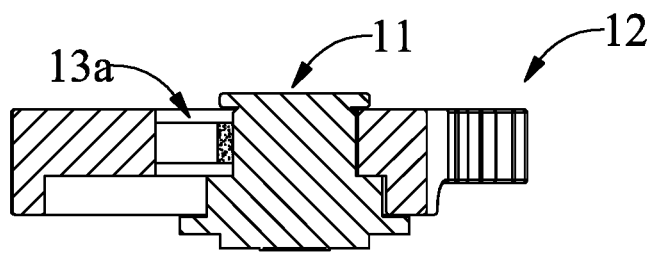
FIG. 8 is a schematic view of a fastener structure according to a fourth embodiment of the present invention.

Please refer to FIGS. 7 and 8 that are schematic views of a fastener structure according to a fourth embodiment of the present invention. As shown, in the fourth embodiment, the fastener structure includes an elastic element 13a in the form of a spring plate or an elastic pillar having two ends separately pressed against the fixing member 11 and the operating member 12. The elastic element 13a can also apply an elastic force against the operating member 12 to enable reciprocatingly and elastically axial, lateral, linear or rotational operation of the operating member 12, or to limit the operating member 12 from moving, staying or temporarily staying.

Figure 9:
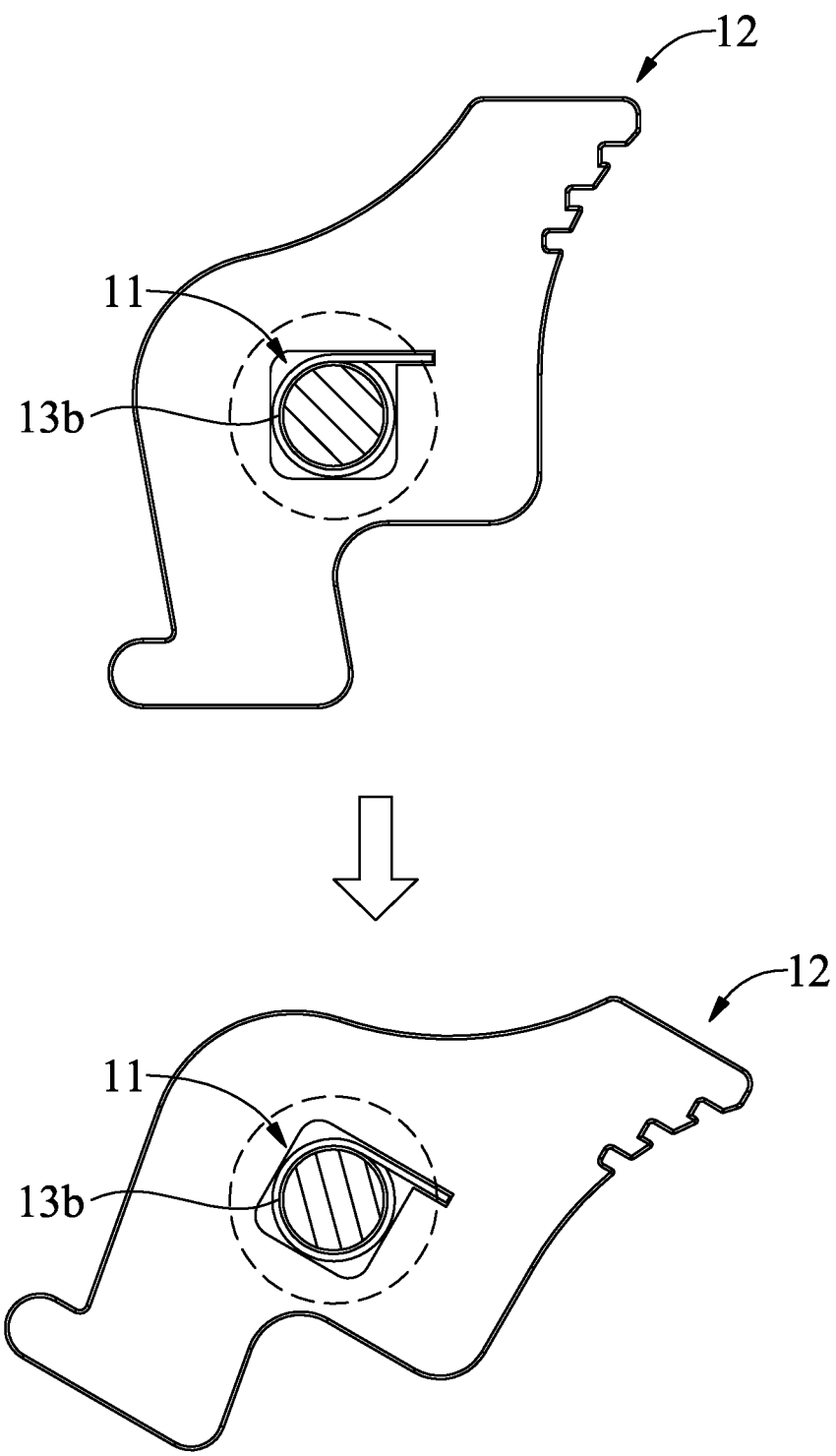
FIG. 9 is a schematic view of a fastener structure according to a fifth embodiment of the present invention.
Figure 10:
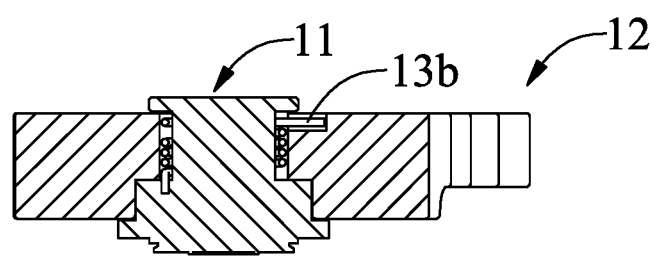
FIG. 10 is a schematic view of a fastener structure according to a fifth embodiment of the present invention.

Please refer to FIGS. 9 and 10 that are schematic views of a fastener structure according to a fifth embodiment of the present invention. As shown, in the fifth embodiment, the fastener structure includes an elastic element 13b in the form of a torsion spring having two ends separately pressed against the fixing member 11 and the operating member 12. The elastic element 13b can also apply an elastic force against the operating member 12 to enable reciprocatingly and elastically axial, lateral, linear or rotational operation of the operating member 12, or to limit the operating member 12 from moving, staying or temporarily staying.

Figure 11:
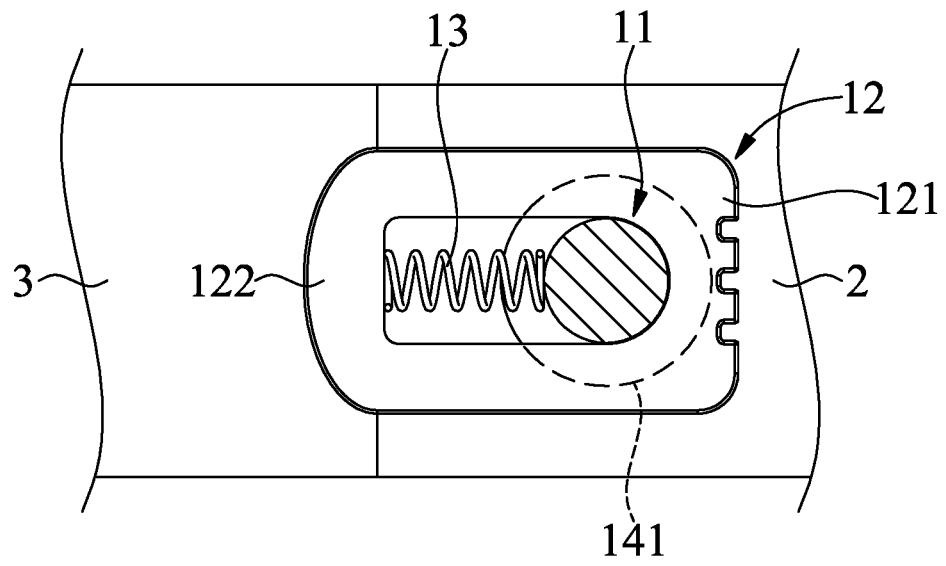
FIG. 11 is a schematic view of a fastener structure according to a sixth embodiment of the present invention.
Figure 11:
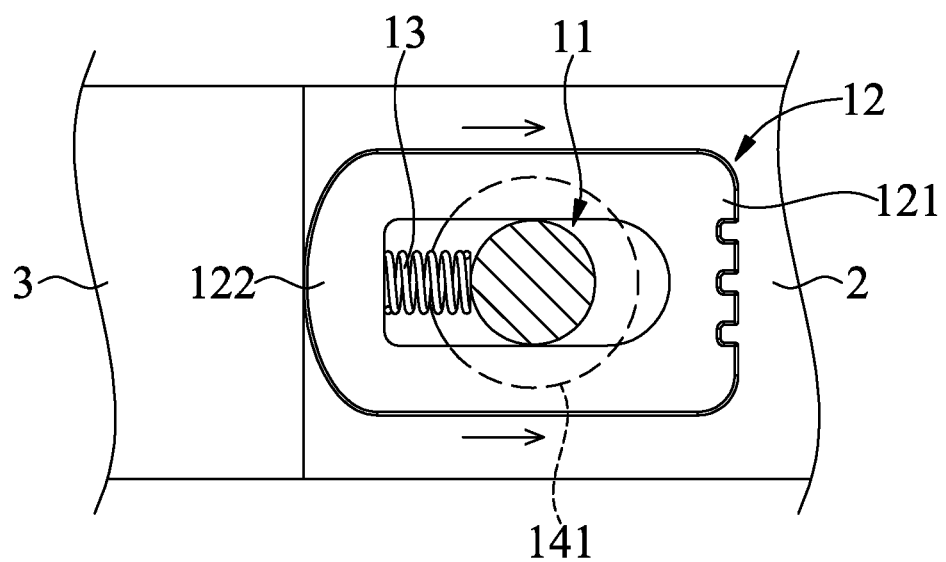

FIG. 11 is a schematic view of a fastener structure according to a sixth embodiment of the present invention. As shown, the fastener structure in the sixth embodiment includes an elastic element 13 having two ends separately pressed against the fixing member 11 and the operating member 12. The elastic element 13 can also apply an elastic force against the operating member 12 to enable reciprocatingly and elastically axial, lateral, linear or rotational operation of the operating member 12, or to limit the operating member 12 from moving, staying or temporarily staying. To use the fastener structure of the sixth embodiment to connect two object together, first connect the coupling section 114 of the fixing member 11 to an object 2, and then apply a force at the operating section 121 for the elastic element 13 to release its elasticity and thereby move the operating member 12 for the retaining section 122 to fasten to another object 3. To separate the two objects from each other, simply apply a force at the operating section 121 in a reverse direction to compress the elastic element 13, and the retaining section 122 is released from the other object 3 to thereby separate the two objects 2, 3 from each other.

Figure 12:
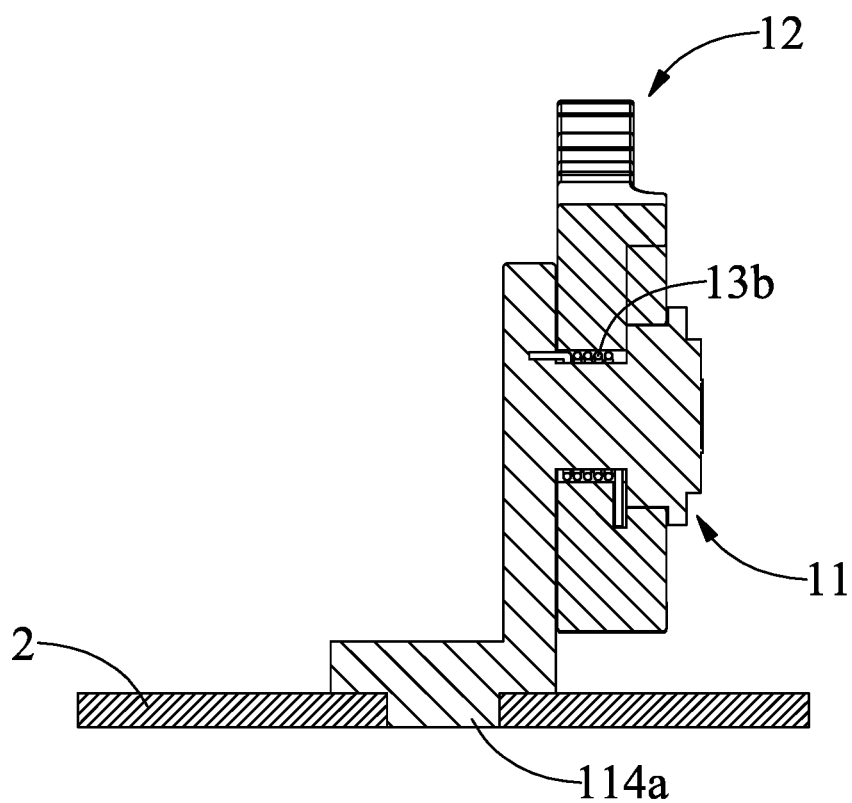
FIG. 12 is a schematic view of a fastener structure according to a seventh embodiment of the present invention.

FIG. 12 is a schematic view of a fastener structure according to a seventh embodiment of the present invention. As shown, the fastener structure in the seventh embodiment includes a coupling section 114b, which is extended from one side of the body portion 112 of the fixing member 11, such that the operating member 12 is in an upright position when the coupling section 114b is connected to an object 2. The fastener structure of the seventh embodiment also includes an elastic element 13b, which has two ends separately pressed against the fixing member 11 and the operating member 12. With these arrangements, the fastener structure of the present invention is more practical for use.

Figure 13:
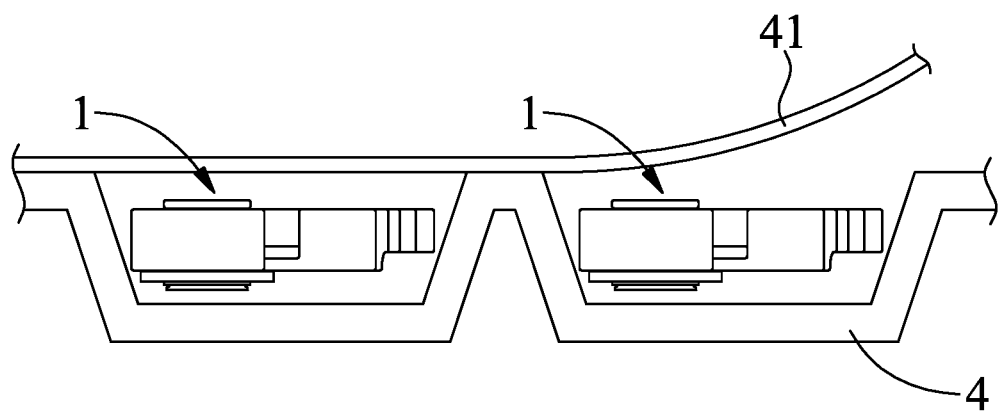
FIG. 13 shows the fastener structure of the present invention can be individually held on a carrier.

FIG. 13 shows the fastener structure 1 of the present invention can be individually held on a carrier 4. The carrier 4 includes a cover 41, which closes the carrier 4 to thereby enclose the fastener structure 1 in the carrier 4. Therefore, the carrier 4 can be used to receive a plurality of fastener structures 1 therein for convenient carrying of the fastener structures 1.

Figure 14:
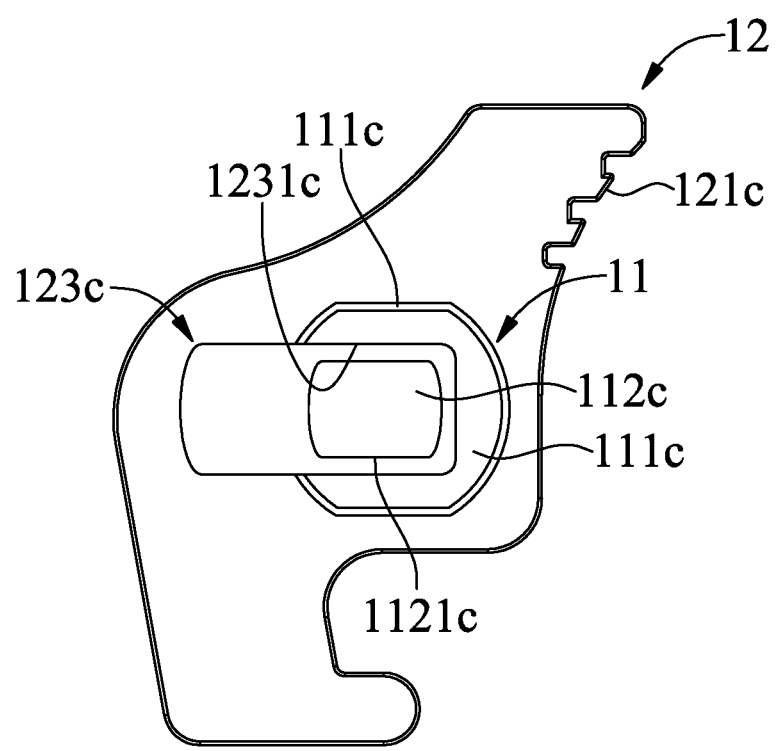
FIG. 14 is a schematic view of a fastener structure according to an eighth embodiment of the present invention.

FIG. 14 is a schematic view of a fastener structure according to an eighth embodiment of the present invention. The fastener structure in the eighth embodiment includes a fixing member 11 having a body portion 112c and a limiting section 111c. The body portion 112c and/or the limiting section 111c are/is provided with an anti-rotation section 1121c, 1111c. The fastener structure in the eighth embodiment also includes an operating member 12 having an operating section 121c and an engaging section 123c. The operating section 121c and/or the engaging section 123c of the operating member 12 are/is provided with a mating anti-rotation section 1211c, 1231c. With these arrangements, it is able to prevent the fixing member 11 and the operating section 121c from rotating relative to each other.

Figure 15:
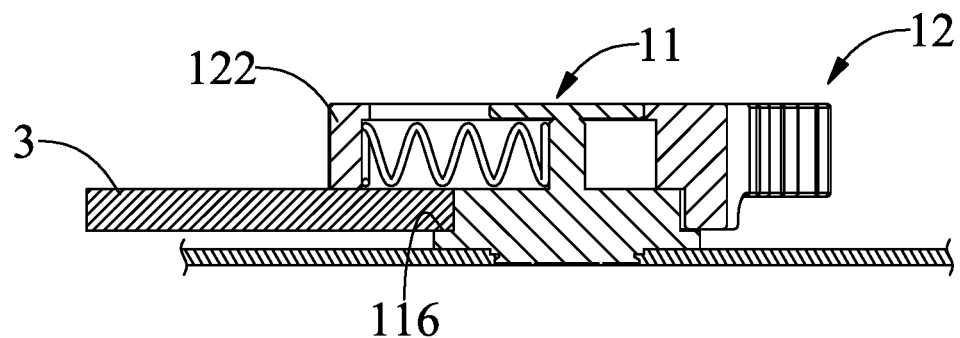
FIG. 15 is a schematic view of a fastener structure according to a ninth embodiment of the present invention.
Figure 15:
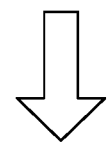
Figure 15:
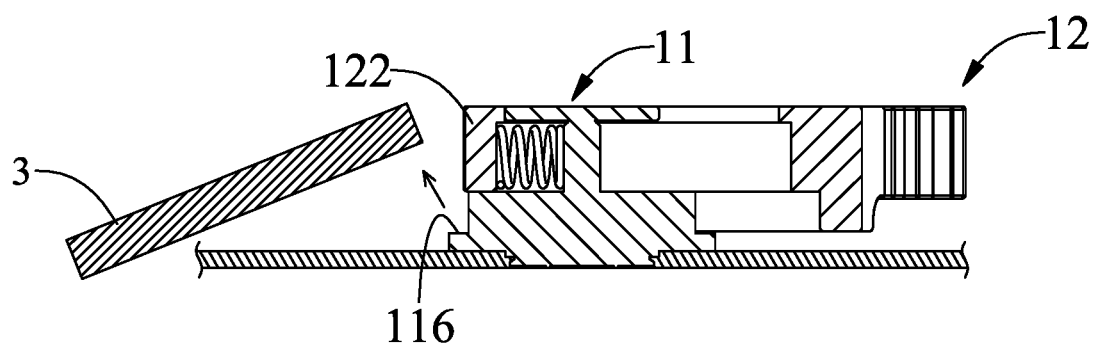

FIG. 15 is a schematic view of a fastener structure according to a ninth embodiment of the present invention. In the ninth embodiment, the fixing member 11 includes a restricting section 116 for restricting another object 3 to between the retaining section 122 and the restricting section 116. The restricting section 116 can be a stepped section.

Figure 16:
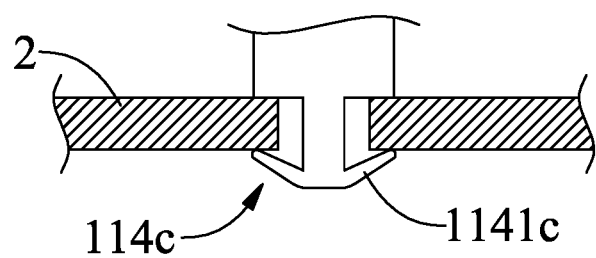
FIG. 16 is a schematic view of a fastener structure according to a tenth embodiment of the present invention.
Figure 17:
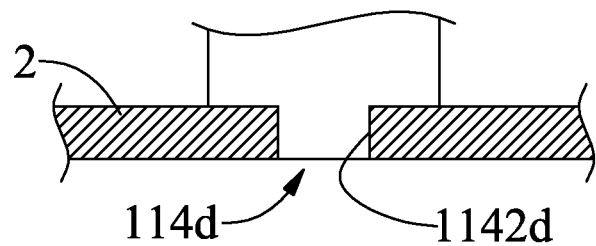
FIG. 17 is a schematic view of a fastener structure according to an eleventh embodiment of the present invention.

Please refer to FIG. 16. A fastener structure according to a tenth embodiment of the present invention includes a coupling section 114c, which is a fastening element or a fastening element having at least one fastening plate 1141c or having a threaded section for fastening to an object 2. Please also refer to FIG. 17. A fastener structure according to an eleventh embodiment of the present invention includes a coupling section 114d, which includes a weldable layer 1142d for welding and accordingly connecting to an object 2. Please also refer to FIG. 17 along with FIG. 13. To use the fastener structure 1 received in the carrier 4, first use a tool (not shown) to pick up the fastener structure 1 and dispose the same on a surface or in a through hole of the object 2, and then, weld the coupling section 114d to the object 2. The welding process can be the surface-mount technology (SMT).

Figure 18:
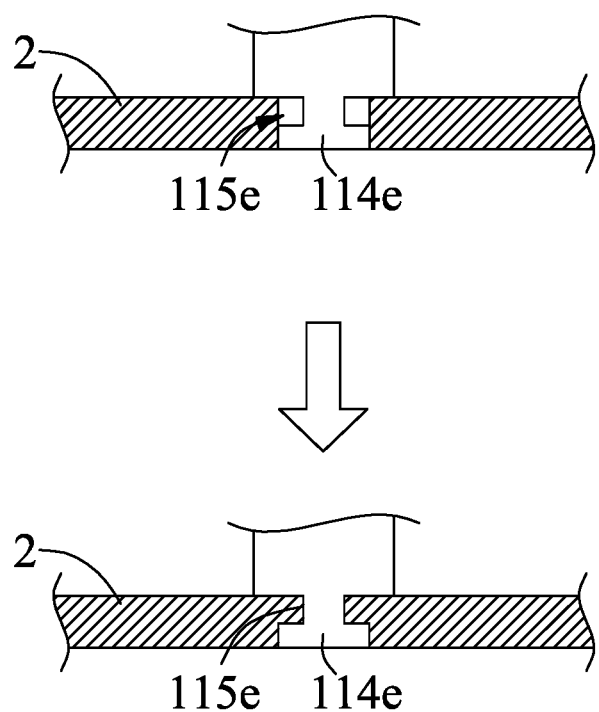
FIG. 18 is a schematic view of a fastener structure according to a twelfth embodiment of the present invention.

FIG. 18 is a schematic view of a fastener structure according to a twelfth embodiment of the present invention. In the twelfth embodiment, the fastener structure includes a coupling section 114e having a material retaining space 115e. When the coupling section 114e is press-fitted onto the object 2, some material of the object 2 enters or flows into the material retaining space 115e, so that the coupling section 114e is connected to the object 2.

Figure 19:
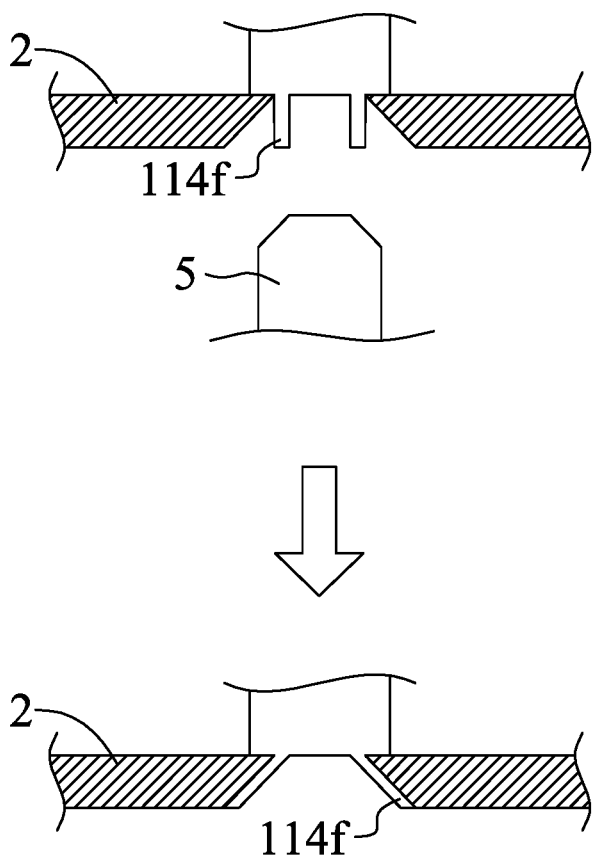
FIG. 19 is a schematic view of a fastener structure according to a thirteenth embodiment of the present invention.

FIG. 19 is a schematic view of a fastener structure according to a thirteenth embodiment of the present invention. The fastener structure in the thirteenth embodiment includes a coupling section 114f. When using a pressing member 5 to apply a force against the coupling section 114f, the coupling section 114f is caused to retain some material of the object 2 thereto and is accordingly connected to the object 2.

Figure 20:
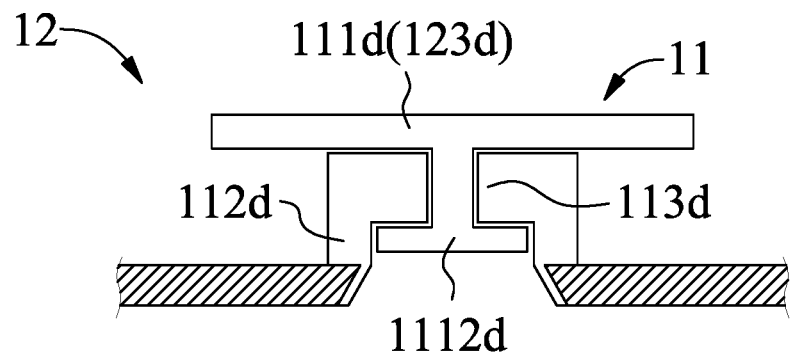
FIG. 20 is a schematic view of a fastener structure according to a fourteenth embodiment of the present invention.
Figure 21:
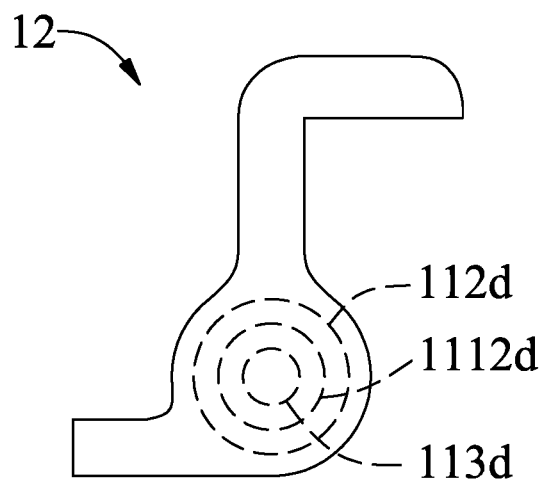
FIG. 21 is a schematic view showing an operating member for the fastener structure according to the fourteenth embodiment of the present invention.
Figure 22:
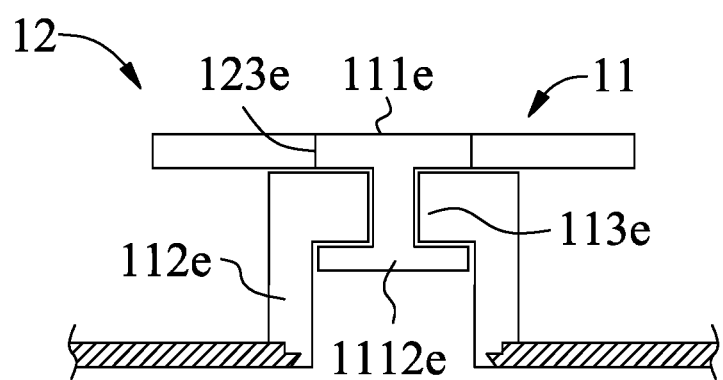
FIG. 22 is a schematic view of a fastener structure according to a fifteenth embodiment of the present invention.

Please refer to FIGS. 20 and 21. In a fastener structure according to a fourteenth embodiment of the present invention, the operating section 12 includes an engaging section 123d and the fixing member 11 includes a limiting section 111d and a body portion 112d. The limiting section 111d is integrally formed with the engaging section 123d and movably connected to the body portion 112d. Further, the limiting section 111d includes a mating abutting section 1112d, and the body 112d includes an abutting section 113d abutted on the mating abutting section 1112d. Please refer to FIG. 22. In a fastener structure according to a fifteenth embodiment of the present invention, the operating section 12 includes an engaging section 123e and the fixing member 11 includes a limiting section 111e and a body portion 112e. The limiting section 111e is engaged with the engaging section 123e and movably connected to the body portion 112e. Further, the limiting section 111e includes a mating abutting section 1112e, and the body 112e includes an abutting section 113e abutted on the mating abutting section 1112e.

The present invention has been described with some preferred embodiments thereof and it is understood that the preferred embodiments are only illustrative and not intended to limit the present invention in any way and many changes and modifications in the described embodiments can be carried out without departing from the scope and the spirit of the invention that is intended to be limited only by the appended claims.

What is claimed is:

1. A fastener structure, comprising:
    a fixing member including a limiting section and a body portion, the fixing member including a coupling section for connecting to an object; and
    an operating member including an operating section, a retaining section, and an engaging section for connecting to the body portion, the retaining section being fastened to or caused to interfere with another object by moving the operating member;
    wherein the retaining section is released from the other object by applying a force at the operating section;
    wherein the engaging section is provided with an elastic element, which has two ends separately pressed against the fixing member and the operating member; and the elastic element being selected from the group consisting of a coil spring, a torsion spring, a spring plate, an elastic pillar, and an elastic structure that is integrally formed with the operating member.

2. The fastener structure as claimed in claim 1, wherein the body portion is extended through the engaging section with the limiting section abutted against the operating member, such that the fixing member is connected to the operating member.

3. The fastener structure as claimed in claim 1, wherein the body portion includes an abutting section, and the operating member being connected to the fixing member to locate between the limiting section and the abutting section or to locate onto the limiting section and the abutting section.

4. The fastener structure as claimed in claim 1, wherein the retaining section can be any one of a pillar, a plate member, a hooked section, a stepped section, a fastening element, a cambered section, a rectangular section, a curved section, a block, a protruded section and a recessed section.

5. The fastener structure as claimed in claim 1, wherein the elastic element applies an elastic force against the operating member to enable reciprocatingly and elastically axial, lateral, linear or rotational operation of the operating member or to limit the operating member from moving, staying or temporarily staying.

6. The fastener structure as claimed in claim 1, wherein the engaging section of the operating member includes an elastic retaining section, which can be integrally formed with the operating member or additionally assembled to the operating member for elastically snap-fitting onto the body portion to move the fixing member or limit the fixing member from moving.

7. The fastener structure as claimed in claim 1, wherein the engaging section internally defines a movement space, within which the fixing member is allowed to move or limited from moving.

8. The fastener structure as claimed in claim 1, wherein the body portion or the limiting section is provided with an anti-rotation section and the operating member or the engaging section of the operating member is provided with a mating anti-rotation section to prevent the operating member and the fixing member from rotating relative to each other.

9. The fastener structure as claimed in claim 1, wherein the operating section can be any one of a protruded section, a recessed section, a stepped section, a grip section, a plate member, a cambered section, a flat section, a curved section, a pillar and a block.

10. The fastener structure as claimed in claim 1, wherein the fixing member includes a restricting section for restricting another object to between the retaining section and the restricting section.

11. The fastener structure as claimed in claim 1, wherein the coupling section includes a weldable layer for welding and accordingly connecting to the object and the fastener structure can be received in a carrier, such that the fastener structure can be removed from the carrier with a tool and disposed on a surface or in a through hole of the object for welding to the object.

12. The fastener structure as claimed in claim 1, wherein the coupling section is provided with a material retaining space for retaining some material of the object thereto, such that the coupling section interferes with the object to thereby connect the fixing member to the object.

13. The fastener structure as claimed in claim 12, wherein the coupling section is press-fitted onto the object and some material of the object enters or flows into the material retaining space to thereby connect the coupling section to the object.

14. The fastener structure as claimed in claim 1, wherein the coupling section is driven by a pressing member to press against the object and retain some material of the object thereto, so as to connect to the object.

15. The fastener structure as claimed in claim 1, wherein the fixing member can be any one of a post-like member, an L-shaped plate member, a block member, a hollow cylindrical member, a solid cylindrical member, a flat plate member, a rectangular member and a stepped member.

16. The fastener structure as claimed in claim 1, wherein the engaging section is integrally formed with or engaged with the limiting section, and the limiting section is movably connected to the body portion.

17. The fastener structure as claimed in claim 1, wherein the limiting section includes a mating abutting section and the body portion includes an abutting section; and the abutting section being abutted on the mating abutting section of the limiting section.

\* \* \* \* \*